United States Patent

Kojima et al.

[11] Patent Number: 5,323,643
[45] Date of Patent: Jun. 28, 1994

[54] DEVICE FOR DETECTING CHANGE IN INTERNAL PRESSURE OF CYLINDER

[75] Inventors: Takao Kojima; Yoshiaki Matsubara; Mitsuru Kondo, all of Nagoya, Japan

[73] Assignee: NGK Spark Plug Co., Ltd., Aichi, Japan

[21] Appl. No.: 863,005

[22] Filed: Apr. 6, 1992

[30] Foreign Application Priority Data

| Apr. 9, 1991 | [JP] | Japan | 3-166941 |
| Apr. 25, 1991 | [JP] | Japan | 3-039033[U] |
| Oct. 23, 1991 | [JP] | Japan | 3-305232 |
| Nov. 6, 1991 | [JP] | Japan | 3-319907 |
| Nov. 8, 1991 | [JP] | Japan | 3-100173[U] |
| Nov. 13, 1991 | [JP] | Japan | 3-326425 |
| Nov. 19, 1991 | [JP] | Japan | 3-103403[U] |
| Dec. 4, 1991 | [JP] | Japan | 3-348160 |

[51] Int. Cl.$^5$ .......................................... G01M 15/00
[52] U.S. Cl. ............................................ 73/115; 73/714
[58] Field of Search ........................ 73/115, 714, 754; 411/531, 542; 29/595

[56] References Cited

U.S. PATENT DOCUMENTS

| 4,191,872 | 3/1980 | Sorenson | 411/531 X |
| 4,898,024 | 2/1990 | Takeuchi | 73/115 |

*Primary Examiner*—Jerry W. Myracle
*Attorney, Agent, or Firm*—Darby & Darby

[57] ABSTRACT

A device for detecting a change in internal pressure of a cylinder includes a cylinder head, an ignition plug threadingly fitted into a plug insertion hole of the cylinder head. An annular piezoelectric sensor is secured in the plug insertion hole by screwing the plug into the insertion hole. The sensor has such an outer periphery that, when the ignition plug is screwed into the plug hole, a part of the outer periphery of the sensor placed is brought into engagement with an inside periphery of the plug hole and is thereby prevented from being further rotated in the screwing direction. By using a gasket having the same relative shape to the periphery of the plug insertion hole as that of the above sensor, rotation of the sensor can be prevented even when the sensor does not have such a relative shape.

13 Claims, 13 Drawing Sheets

DEVICE FOR DETECTING CHANGE IN INTERNAL PRESSURE OF CYLINDER

BACKGROUND OF THE INVENTION

This invention relates generally to a device for detecting a change in internal pressure of a cylinder and, more specifically, to a mounting structure of a piezoelectric sensor mounted to a cylinder head of an internal combustion engine to detect a change in pressure within the cylinder caused by knocking or fuel injection. The present invention is also directed to a method of the manufacture of a piezoelectric sensor.

One known internal pressure detecting device is illustrated in FIGS. 25 and 26. Designated as S is an annular piezoelectric sensor composed of a metal shell surrounding a laminate including an annular piezoelectric element and upper and lower cushioning rings. The sensor S is fixed on a plug seat $r_2$ by tightening with an ignition plug T so that the pressure change within the cylinder is transmitted to the sensor S as a mechanical strain to cause the sensor S to output a corresponding electrical. More particularly, the cylinder head P is provided with a plug insertion hole $r_1$ having the plug seat $r_2$ and an internally threaded portion $r_3$. The ignition plug T has a stepped portion $t_2$ engageable with the plug seat $r_2$ and an externally threaded tip end portion threadingly engageable with the internally threaded portion $r_3$, so that when the plug T is screwed in the plug hole $r_1$, the sensor S disposed on the plug seat $r_2$, optionally through a gasket, is tightly fixed thereon. The shell 4 of the sensor S is composed of an outer ring plate 5a, an inner ring plate 5b and an annular bottom plate 5c by which an annular space 6 is defined. Disposed in the space 6 are a pair of annular piezoelectric elements 1 and 1, an annular electrode plate 2 interposed between the piezoelectric elements 1 and 1, and a top cushioning ring 3. These parts are coaxially aligned and integrally united with an adhesive or by caulking. The electrode ring 2 has a portion 2a which extends radially outwardly through the outer ring plate 5a and to which a lead wire 7 is electrically connected to send an electrical signal from the sensor S to a suitable signal detecting device (not shown).

In the above mounting structure, the sensor S is pressed between the plug seat $r_2$ of the plug insertion hole $r_1$ and the stepped portion $t_2$ of the plug T. Thus, the tightening torque of the plug T is acted on the sensor S directly or indirectly through a gasket. Since such a torque includes both axial compression stress and tortional or twisting stress, the sensor S which has relatively low shearing strength tends to be broken or damaged and is deteriorated in the piezoelectric characteristics thereof. To cope with this problem, a stopper is disposed for preventing the rotation of the sensor S at the time of the mounting on the cylinder head P. The use of such a stopper, however, is disadvantageous from the standpoint of economy and productivity because the mounting structure becomes unavoidably complicated. Further, the use of a stopper results in the increase in distance between the top surface of the sensor S and the plug seat $r_2$ so that it becomes difficult to locate the tip end of the plug P, at which spark discharge takes place, at an appropriate position.

SUMMARY OF THE INVENTION

It is, therefore, an object of the present invention to provide a cylinder internal pressure change detecting device which is devoid of the drawbacks of the known device.

Another object of the present invention is to provide a device of the above-mentioned type which does not use a specific stopper and which can prevent a twisting stress from acting on the piezoelectric sensor during the mounting thereof on the cylinder head.

It is a further object of the present invention to provide a device of the above-mentioned type which is easily fabricated.

It is yet a further object of the present invention to provide a simple method for fabricating the above piezoelectric sensor.

In accomplishing the foregoing objects there is provided in accordance with one aspect of the present invention a device for detecting a change in internal pressure of a cylinder, which comprises:

a cylinder head;

an axially extending ignition plug including a large diameter periphery portion, a small diameter periphery portion extending coaxially from an edge of the large diameter portion to form an annular stepped portion on the edge, and an externally threaded tip end portion coaxially extending from the small diameter periphery portion;

a plug insertion hole formed in the cylinder head for receiving part of the ignition plug and having an internally threaded portion adapted to be in threading engagement with the externally threaded tip end portion of the ignition plug and a plug seat engageable with the annular stepped portion of the ignition plug; and an annular piezoelectric sensor disposed on the plug seat and having an opening whose diameter is greater than that of the small diameter periphery portion of the ignition plug but smaller than the large diameter periphery portion thereof, so that the ignition plug is capable of being fixed on the cylinder head when screwed into the plug insertion hole with the piezoelectric sensor being tightly pressed between the annular stepped portion of the ignition plug and the plug seat of the plug insertion hole to detect a change in pressure within the cylinder;

the sensor having such an outer periphery that, when the ignition plug is screwed for being fitted to the plug hole, a part of the outer periphery of the sensor placed on the plug seat is brought into engagement with an inside periphery of the plug hole and is thereby prevented from being further rotated in the screwing direction.

In another aspect, the present invention provides a device for detecting a change in internal pressure of a cylinder, which comprises:

a cylinder head;

an axially extending ignition plug including a large diameter periphery portion, a small diameter periphery portion extending coaxially from an edge of the large diameter portion to form an annular stepped portion on the edge, and an externally threaded tip end portion coaxially extending from the small diameter periphery portion;

a plug insertion hole formed in the cylinder head for receiving part of the ignition plug and having an internally threaded portion adapted to be in threading engagement with the externally threaded tip end portion of the ignition plug and a plug seat engageable with the annular stepped portion of the ignition plug, the plug insertion hole having a circular inside peripheral portion whose center is deviated from the axis of the internally threaded portion of the plug hole;

an annular piezoelectric sensor disposed on the plug seat and having an opening whose diameter is greater than that of the small diameter periphery portion of the ignition plug but smaller than the large diameter periphery portion thereof, so that the ignition plug is capable of being fixed on the cylinder head when screwed into the plug insertion hole with the piezoelectric sensor being tightly pressed between the annular stepped portion of the ignition plug and the plug seat of the plug insertion hole to detect a change in pressure within the cylinder; and an annular gasket interposed between the piezoelectric sensor and the stepped portion of the ignition plug and having a radially outwardly extending, protruded portion, the distance between the edge of the protruded portion and the axis of the internally threaded portion of the plug hole being greater than the shortest distance between the axis of the internally threaded portion and the circular inside periphery of the plug insertion hole, so that the protruded portion of the gasket is brought into engagement with the circular inside periphery of the plug insertion hole upon rotation of thereof about the axis of the internally threaded portion of the plug insertion hole.

The present invention also provides a method of the production of a piezoelectric sensor, which comprises the steps of:

providing a shell in the form of a ring having an annular top plate and a pair of outer and inner tubular plates extending from the outer and inner peripheral edges of the top plate, respectively, in the direction perpendicular to the top plate, the outer and inner edges of the top plate being circular in shape with the center of the outer edge being deviated from that of the inner edge;

providing an annular composite body including an annular layer of a piezoelectric element;

providing an annular bottom plate which matches the annular space defined between the outer and inner tubular plates;

fitting the composite body and the bottom plate in this order in the space between the outer and inner tubular plates with the openings of the composite body and the bottom plate being inserted into the inner tubular plate;

radially outwardly folding an end portion of the inner tubular plate to cover an inner periphery of the bottom plate; and then radially inwardly folding an end portion of the outer tubular plate to cover an outer periphery of the bottom plate, thereby to integrally tightly unite the composite body and the bottom plate in the shell.

BRIEF DESCRIPTION OF THE DRAWINGS

Other objects, features and advantages of the present invention will become apparent from the detailed description of the preferred embodiments of the invention which follows, when considered in the light of the accompanying drawings, in which.

DETAILED DESCRIPTION OF THE PREFERRED EMBODIMENTS OF THE INVENTION

Figure 1:
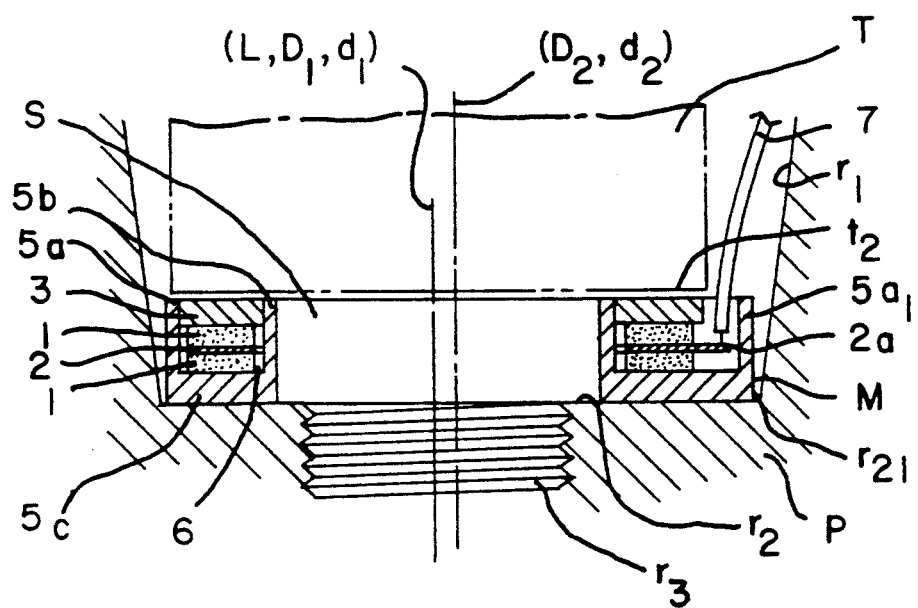
FIG. 1 is a fragmentary, cross-sectional, elevational view diagrammatically showing one embodiment of cylinder internal pressure change detecting device according to the present invention.
Figure 2:
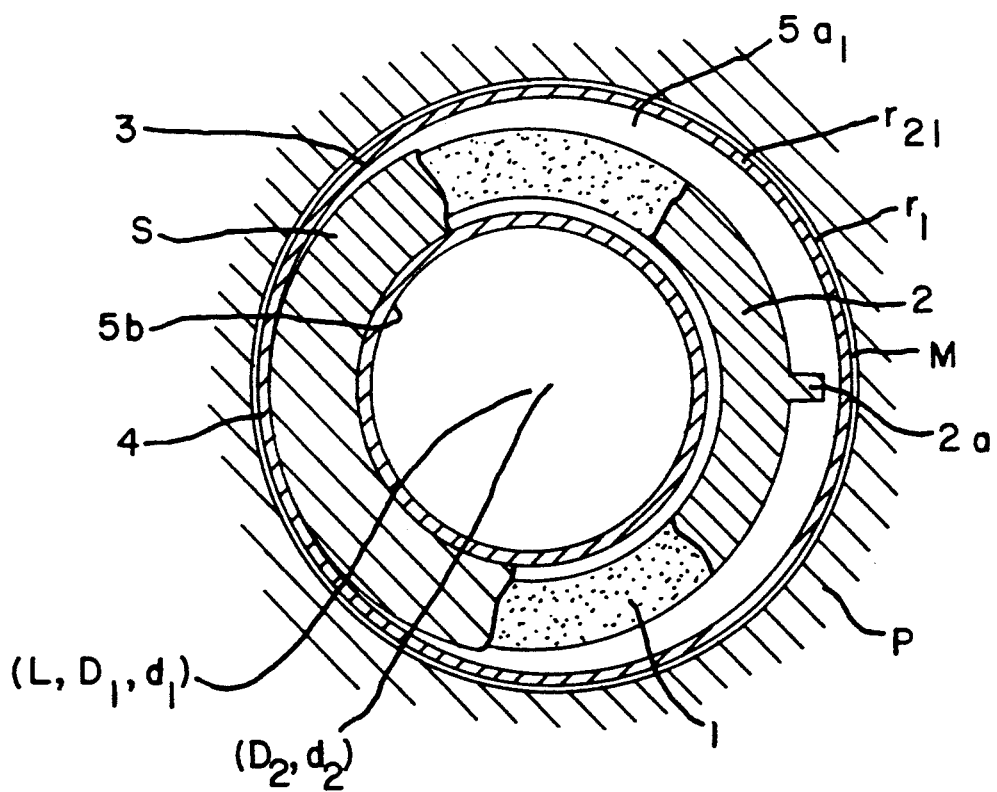
FIG. 2 is a cross-sectional plan view of the device of FIG. 1.

FIGS. 1 and 2 depict a first embodiment of a cylinder internal pressure detecting device according to the present invention. In the FIGS. 1 and 2 as well as other Figures, the same reference numerals refer to similar component parts. Thus, designated as T is an axially extending ignition plug including a large diameter periphery portion, a small diameter periphery portion extending coaxially from an edge of the large diameter portion to form an annular stepped portion $t_2$ on the edge, and an externally threaded tip end portion coaxially extending from the small diameter periphery portion. The plug T is arranged to be attached to a plug insertion hole $r_1$ formed in a cylinder head P.

The plug insertion hole $r_1$ has an internally threaded portion $r_3$ adapted to be in threading engagement with the externally threaded tip end portion of the ignition plug T and a plug seat $r_2$ engageable with the annular stepped portion $t_2$ of the ignition plug T.

Disposed on the plug seat $r_2$ is an annular piezoelectric sensor S having an opening whose diameter is greater than that of the small diameter periphery portion of the ignition plug T but smaller than the large diameter periphery portion thereof, so that when the ignition plug T is screwed into the plug insertion hole $r_1$ the piezoelectric sensor S is tightly pressed between the annular stepped portion $t_2$ of the ignition plug T and the plug seat $r_2$ of the plug insertion hole $r_1$.

The sensor S and the plug insertion hole $r_1$ are shaped so that when the ignition plug T is screwed for being fitted to the plug hole $r_1$, part of the outer periphery of the sensor S placed on the plug seat $r_2$ is brought into engagement with an inside periphery of the plug hole $r_1$ and is thereby prevented from being further rotated in the screwing direction. Namely, the sensor S has such a portion M in the outer periphery $5a$ thereof that the distance between the portion M and the rotational axis L is greater than the shortest distance between the inside periphery of the insertion hole $r_1$ extending from the plug seat $r_2$ and the rotational axis L.

In the embodiment shown in FIGS. 1 and 2, the plug hole $r_1$ has a circular cross section and has a central axis $D_2$ which is deviated from the central axis $D_1$ of the internally threaded portion $r_3$. The central axis $D_1$ serves as a rotational axis L of the ignition plug T. The sensor S has a circular outer ring plate $5a_1$ whose center axis $d_2$ is deviated from the center axis $d_1$ of the inner ring plate $5b$. The axes $d_1$ and $d_2$ coincide with the axes $D_1$ and $D_2$, respectively. Further the diameter of the sensor S is smaller than that of the circular inside periphery $r_{21}$ extending from the plug seat $r_2$ but is larger than the shortest distance between the rotation axis L and the inner periphery $r_{21}$ so that the outer periphery $5a_1$ of the sensor S has a portion M which is engageable with the inside peripheral portion $r_{21}$ of the plug insertion hole $r_1$ upon rotation thereof about the axis L of the internally threaded portion $r_3$ of the plug insertion hole $r_1$.

Figure 3:
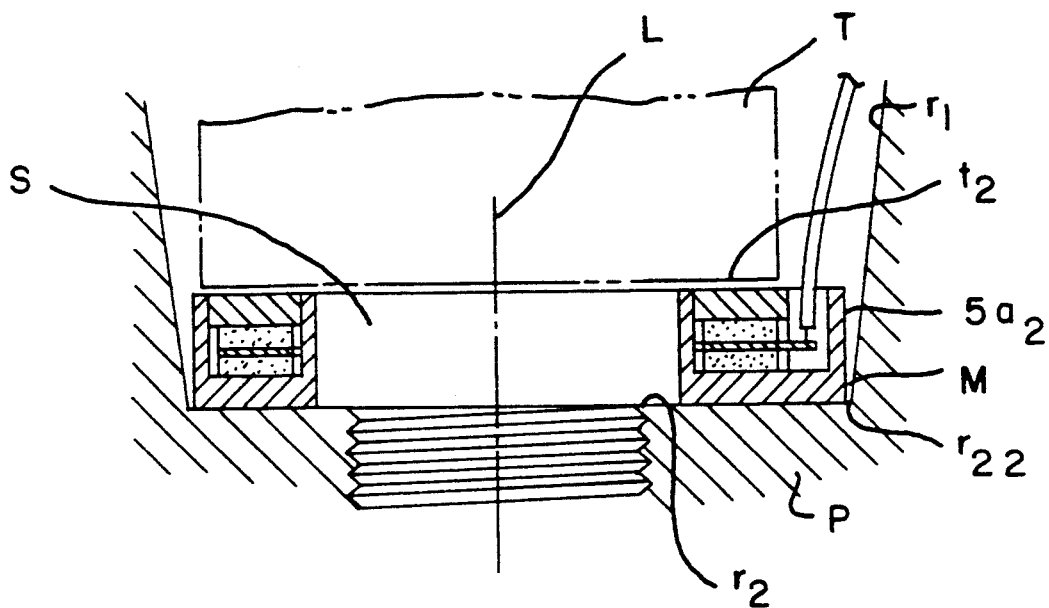
FIG. 3 is a fragmentary, cross-sectional, elevational view, similar to FIG. 1, diagrammatically showing a second embodiment of the present invention.
Figure 4:
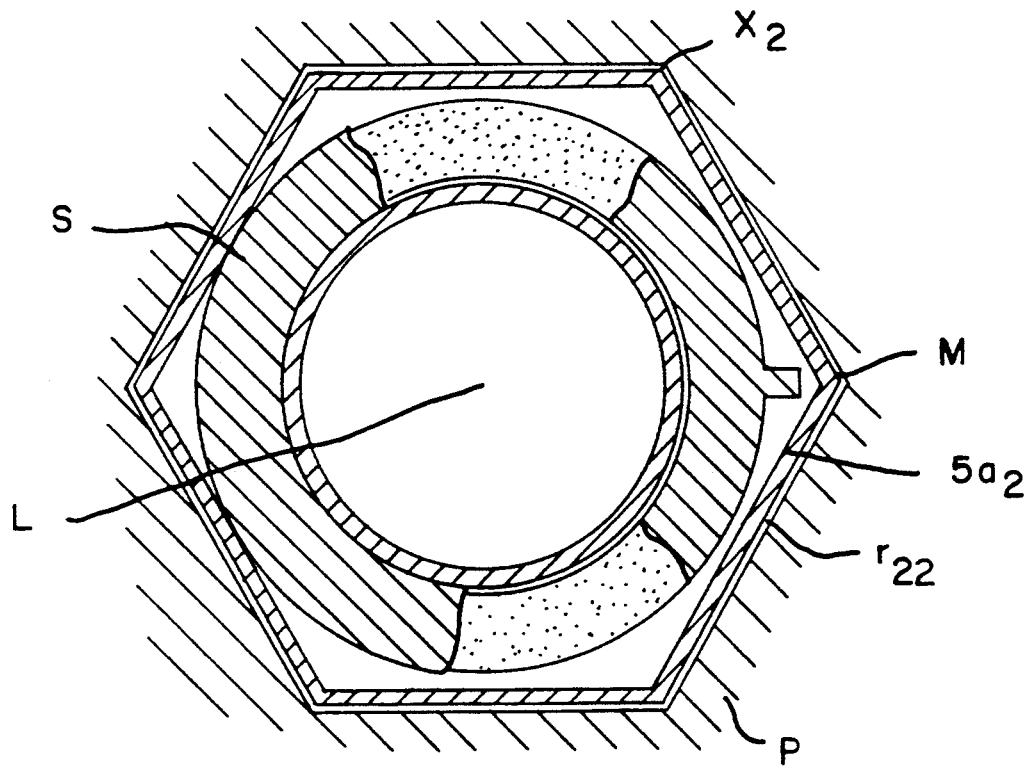
FIG. 4 is a cross-sectional plan view of the device of FIG. 3.

In the embodiment FIGS. 3 and 4, the sensor S has a polygonal (hexagonal in the specific embodiment shown) outer periphery $5a_2$ and the plug insertion hole $r_1$ has a polygonal (hexagonal in this embodiment) inside peripheral portion $r_{22}$ extending the plug seat $r_2$ so that the outer periphery $5a_2$ of the sensor S has a portion M which is engageable with the inside peripheral portion $r_{22}$ of the plug insertion hole $r_1$ upon rotation thereof about the axis L of the internally threaded portion $r_3$ coaxially formed in the plug insertion hole $r_1$.

Figure 5:
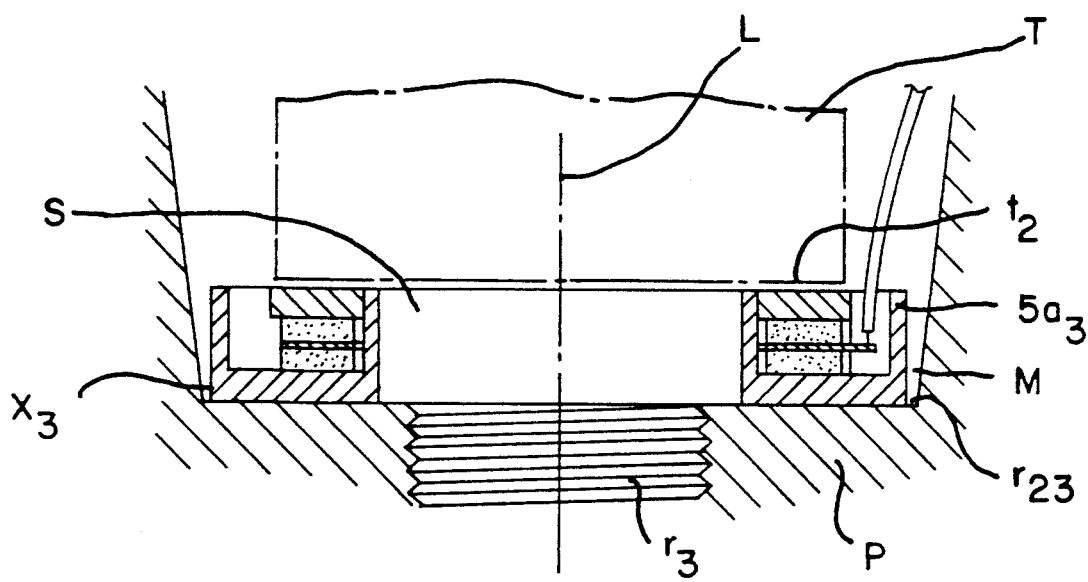
FIG. 5 is a fragmentary, cross-sectional, elevational view, similar to FIG. 1, diagrammatically showing a third embodiment of the present invention.
Figure 6:
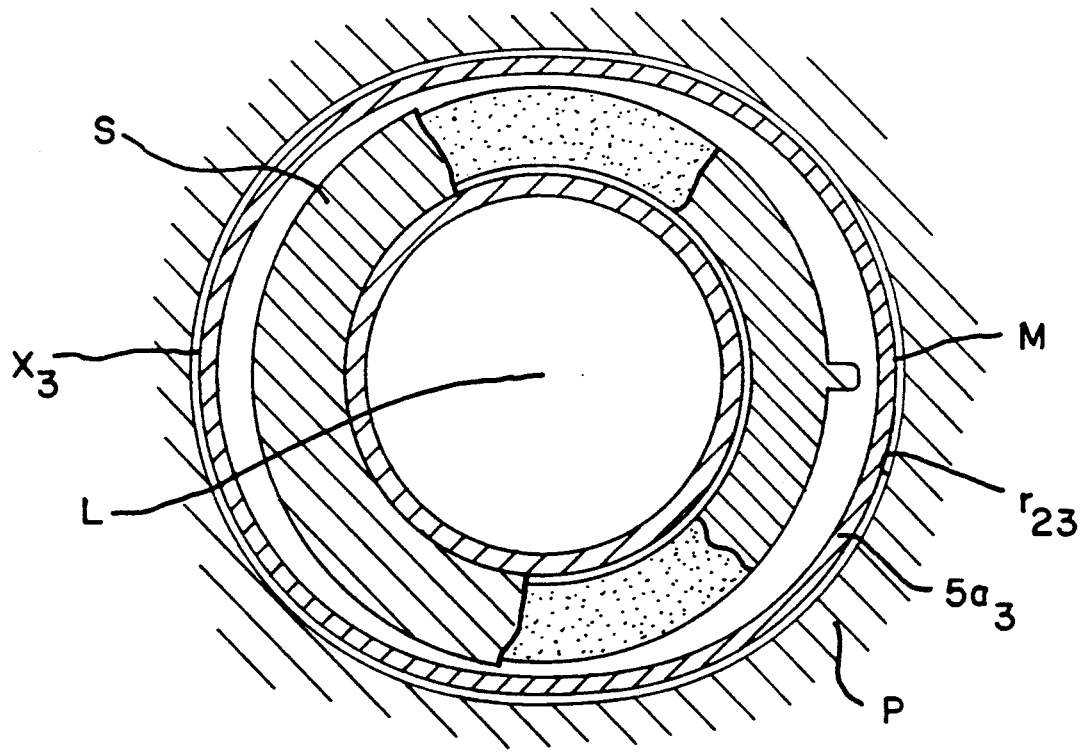
FIG. 6 is a cross-sectional plan view of the device of FIG. 5.

In the embodiment shown in FIGS. 5 and 6, the sensor S has a ellipsoidal outer periphery $5a_3$ and the plug insertion hole $r_1$ has an ellipsoidal inside peripheral portion $r_{23}$ extending from the plug seat $r_2$ so that the outer periphery $5a_3$ of the sensor S has a portion M which is engageable with the inside peripheral portion $r_{23}$ of the plug insertion hole 1 upon rotation thereof about the axis L of the internally threaded portion $r_3$ of the plug insertion hole $r_1$.

Figure 7:
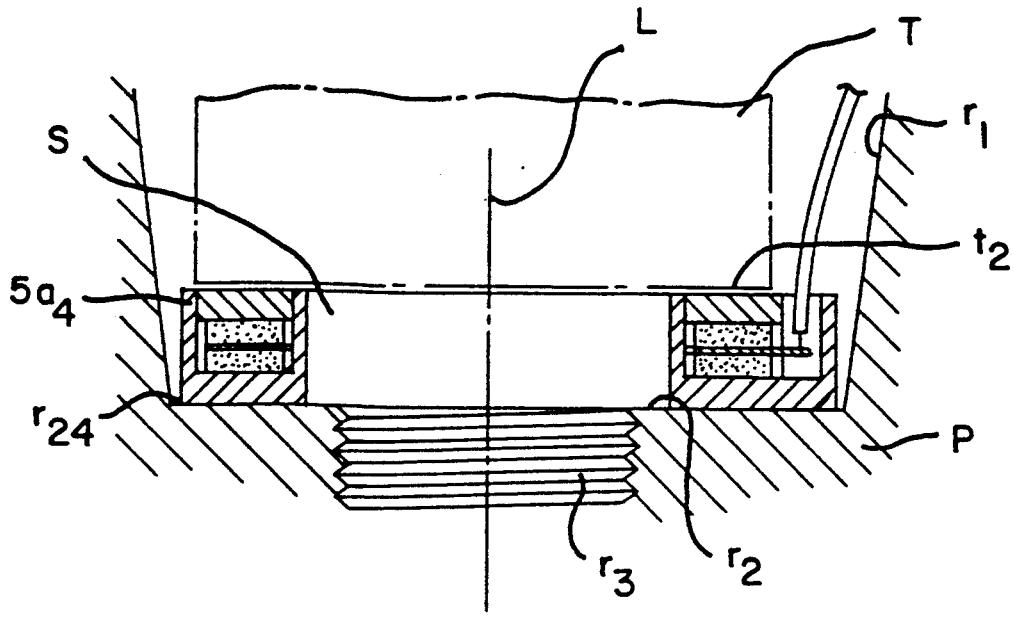
FIG. 7 is a fragmentary, cross-sectional, elevational view, similar to FIG. 1, diagrammatically showing a fourth embodiment of the present invention.
Figure 8:
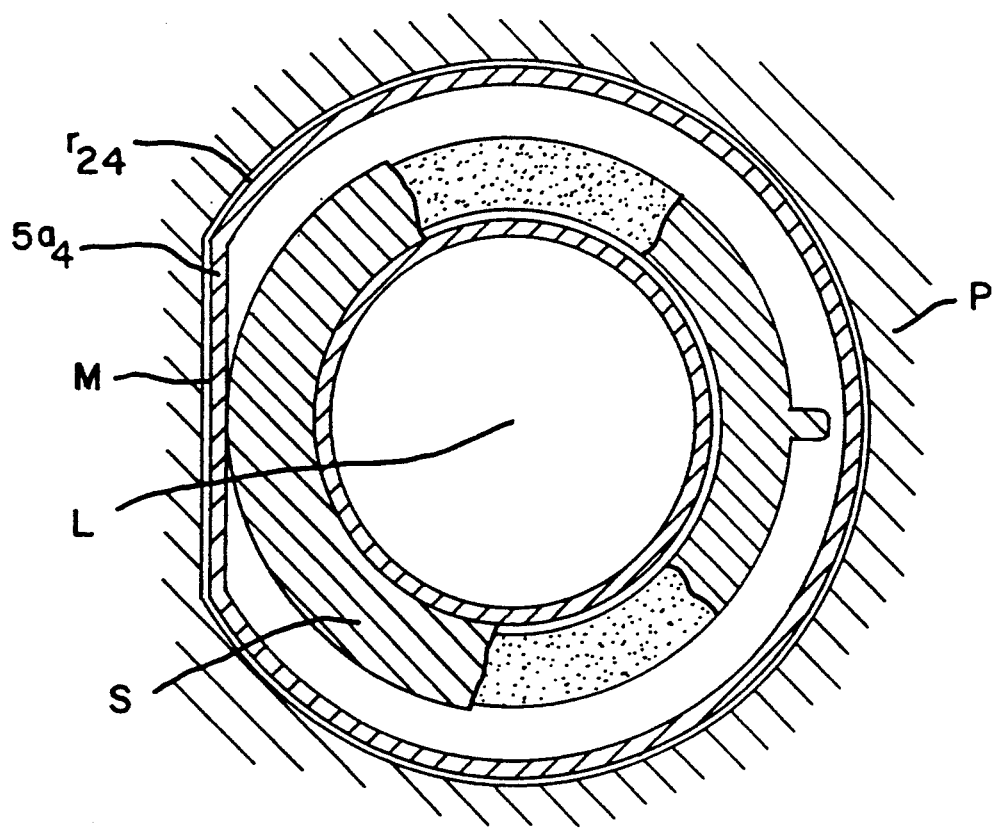
FIG. 8 is a cross-sectional plan view of the device of FIG. 7.

In the embodiment shown in FIGS. 7 and 8, the sensor S has a D-shaped outer periphery $5a_4$. Namely, the outer periphery of the sensor S is circular in shape with an arc portion being cut away therefrom. The plug insertion hole $r_1$ too has a D-shaped inside peripheral portion $r_{24}$ so that the outer periphery $5a_4$ of the sensor S has a portion M which is engageable with the inside peripheral portion $r_{24}$ of the plug insertion hole $r_1$ upon rotation thereof about the axis L of the internally threaded portion $r_3$ of the plug insertion hole $r_1$.

In lieu of forming the cut-away portion in the above embodiment, it is possible to provide a radially outwardly protruded portion on the outer periphery $5a$ of the circular sensor S. By this, the protruded portion is engageable with an inside peripheral portion $r_{24}$ of the plug insertion hole $r_1$ upon rotation thereof about the axis L of the internally threaded portion $r_3$ of the plug insertion hole $r_1$.

In the foregoing embodiments shown in FIGS. 1–8, when the ignition plug T is screwed into the insertion hole $r_1$ with the sensor S being placed on the plug seat $r_2$, the stepped portion $t_2$ of the plug T is brought into frictional contact with the upper surface of the sensor S and urges the sensor S to rotate in the screwing direction. When the portion M of the outer surface $5a_1$–$5a_4$ is engaged with the inside periphery $r_{21}$–$r_{24}$ extending from the plug seat $r_2$, however, a further rotation of the sensor S is prevented so that only the compression force is applied to the sensor S by screwing the plug T, ensuring the proper pressure detection by the sensor S.

In the foregoing embodiments, the space between the metal shell 4 and the laminate including the piezoelectric elements 2 may be filled with a heat-resisting, electrically insulating material such as an epoxy resin composition, if desired.

Figure 9:
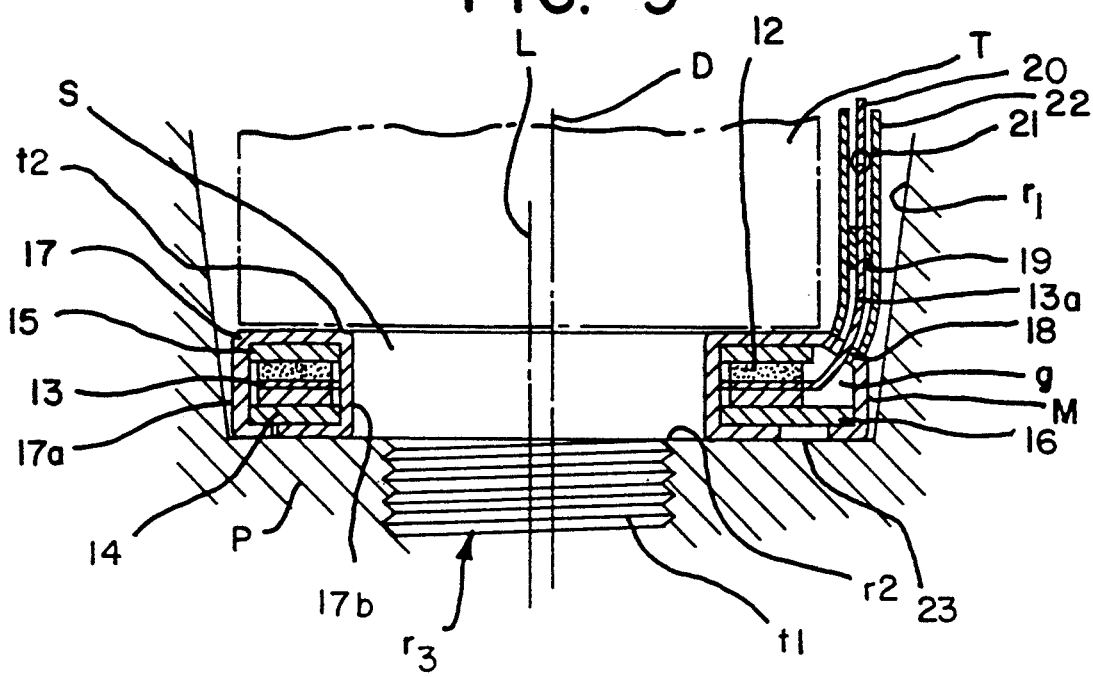
FIG. 9 is a fragmentary, cross-sectional, elevational view, similar to FIG. 1, diagrammatically showing a fifth embodiment of the present invention.
Figure 10:
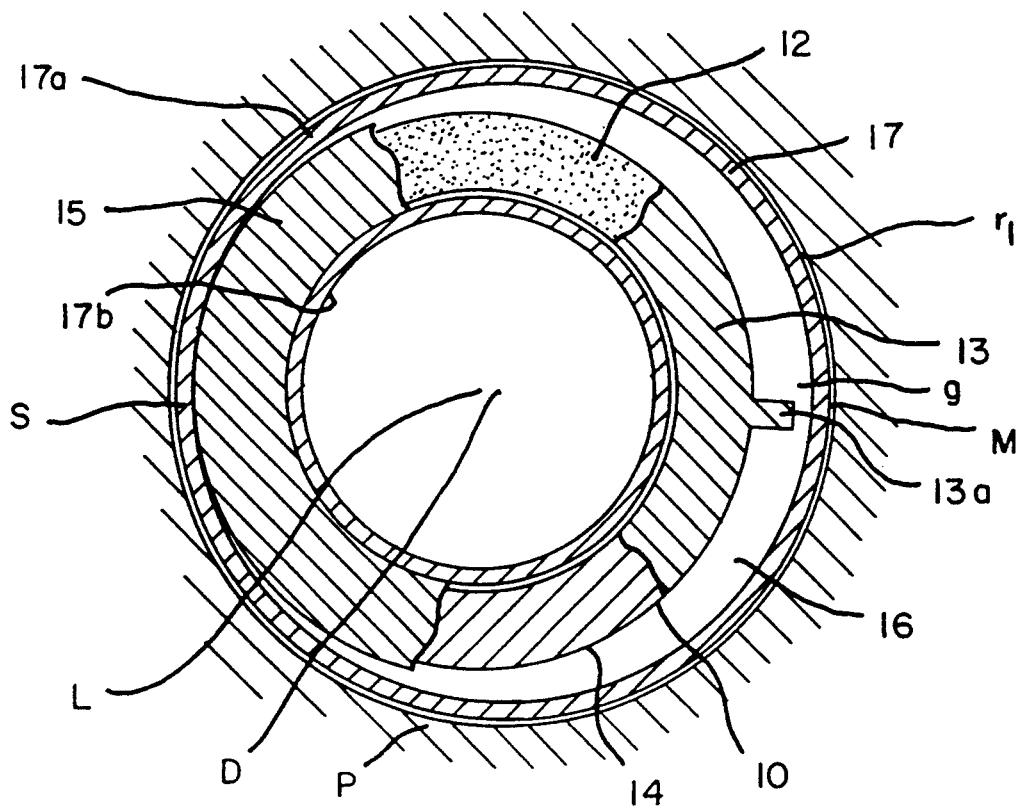
FIG. 10 is a cross-sectional plan view of the device of FIG. 9.

FIGS. 9 and 10 illustrate a further embodiment similar to the embodiment of FIGS. 1 and 2. In this embodiment, the sensor S includes a ring-shaped shell 17 composed of a pair of parallel, top and bottom annular walls and a pair of outer and inner tubular walls 17a and 17b. Disposed within the shell 17 is a laminate 10 including an annular piezoelectric element 12, a ring electrode 13, an insulating ring plate 14 formed, for example, of alumina, an annular, top plate 15 formed of a metal such as aluminum or stainless steel, and an annular bottom plate 16 formed of a metal similar to the plate 15. The bottom wall of the shell 17 is formed by radially inwardly bending an end portion of the outer tubular wall and by radially outwardly bending an end portion of the inner tubular wall such that the laminate 10 is tightly held within the shell 17 with an abutting portion or aperture 23 being positioned in the bottom of the shell 17. The corner edges of the top and bottom plates 15 and 16 may be rounded so as to improve the close contact between the laminate 10 and the shell 17.

Similar to the embodiment shown in FIGS. 1 and 2, the cylinder head P has a plug hole $r_1$ which has a circular cross section and whose central axis D is deviated from the central axis L of the internally threaded portion $r_3$ into which a plug T is to be threadingly fitted. The outer tubular wall 17a of the sensor S has a circular outer periphery whose center axis is deviated from the center axis of the inner tubular wall 17b. The central axes of the outer and inner walls 17a and 17b of the sensor S coincide with the axes D and L, respectively. Further, the diameter of the outer tubular wall 17a of the sensor S is smaller than or equal to that of the circular inside periphery extending from the plug seat $r_2$ so that the outer periphery of the sensor S has a portion M which is engageable with the inside peripheral portion of the plug insertion hole $r_1$ upon rotation thereof about the axis L of the internally threaded portion $r_3$ of the plug insertion hole $r_1$.

Figure 12:
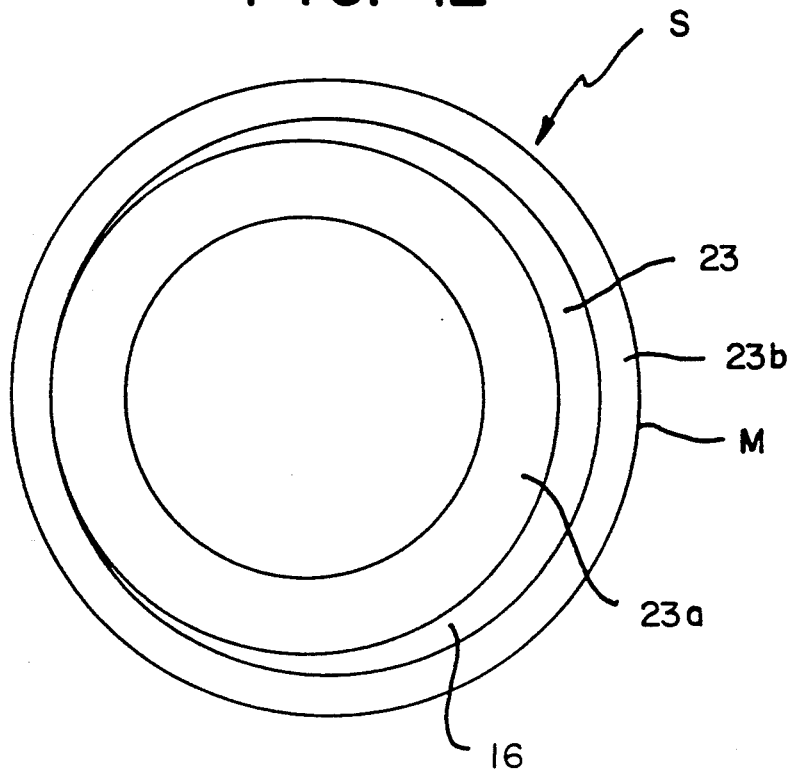
FIG. 12 is a bottom view of the sensor of FIG. 9.

As seen from FIG. 12 showing a bottom view, the sensor S has an annular shape whose radial width varies throughout. The bottom plate 16 is eccentric and extends throughout the inside bottom wall of the sensor S while the top plate 15 is concentric and has the same diameter as that of the laminate 10.

As a result of the above construction, there is defined a space g between the outer periphery of the laminate 10 and the outer tubular wall 17a of the shell. This space g is used to connect a lead wire 10 to the electrode plate 13. Thus, a portion of the edge defined by the top wall and the outer wall a of the shell 17 is tapered at a position adjacent to the space g to form a tapered surface 17c. The tapered surface 17c is provided with an opening 18 and with a guide pipe 19 fixed thereto, for example, by soldering. The guide pipe 19 is oriented in the direction normal to the tapered surface 17c which is oriented at an angle of 15° to 45° with respect to the top wall of the sensor S. The guide pipe 19 is bent and vertically extends in the end portion 22. The electrode ring 13 has an extended portion 13a extending through the space g, the opening 18 and the guide pipe 19 and is electrically connected to the lead wire 20 with a solder 21.

The sensor S provided with the above wire leading structure is placed on the plug seat $r_2$ and is fixed there by screwing the plug T in the threaded portion $r_3$. In this case, since the guide pipe 19 is obliquely oriented, a sufficient space is available in the plug insertion hole $r_1$ to insert a tightening tool for the attachment of the plug T to the hole $r_1$. Since the screwing of the plug T into the hole $r_1$ does not cause the sensor S to freely rotate, a shearing stress is not acted on the sensor S. In the thus constructed device according to the present invention, when the pressure within the cylinder is changed, this is transmitted to the sensor S through the plug T. The mechanical stress is thus transmitted to the piezoelectric element 12 through the upper and lower plates 15 and 16 so that an electrical signal corresponding to the mechanical stress is outputted from the sensor S and is fed through the electrode ring 13 and lead wire 20 to a suitable signal detector.

Figure 11:
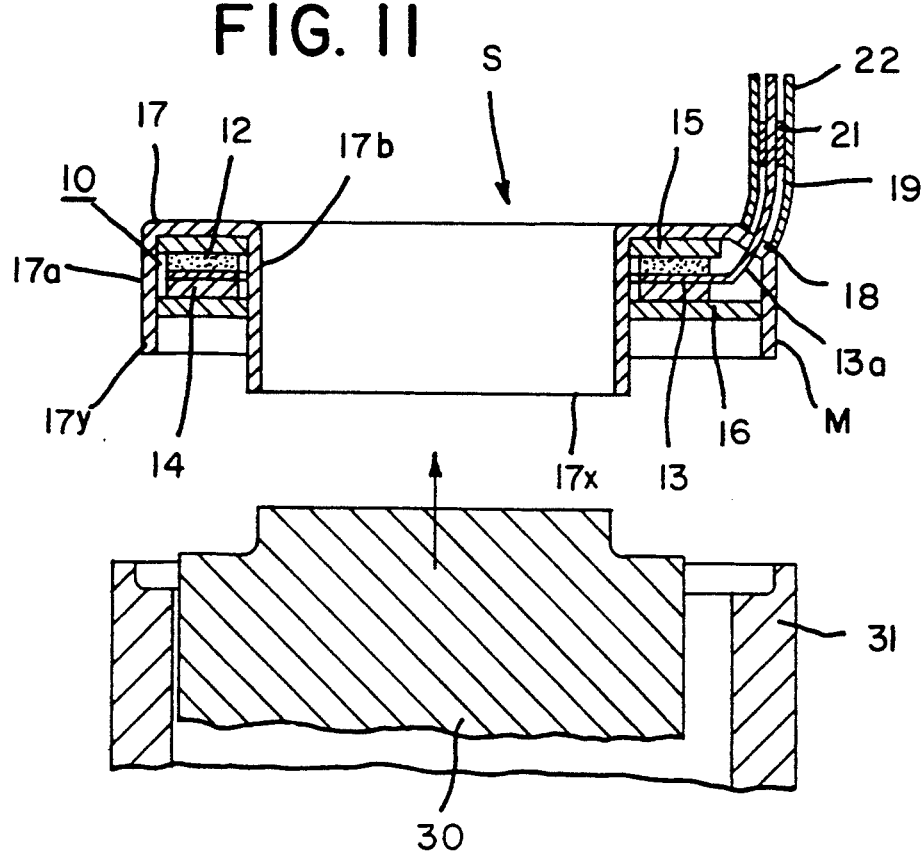
FIG. 11 is a fragmentary, cross-sectional, elevational view schematically showing the fabrication of the piezoelectric sensor assembly of FIG. 9.

As described previously, the bottom wall of the sensor S is formed by bending end portions of the outer and inner tubular side walls. FIG. 11 illustrates the fabrication of such a sensor S. The outer and inner ring plates 17a and 17b have extensions 17y and 17x, respectively. After the laminate 10 has been fitted into the shell 17, the extensions 17y and 17x are bent and pressed over the bottom plate 16. In this case, the length of the extension 17x is greater than that of the extension 17y and the extension 17x is bent prior to the extension 17y.

When the longer extension 17x is bent by means of press-bending means 30, the bent portion 17x can be tightly pressed against the bottom plate 16 because the space in the shell 17 is filled with the laminate 10. Thus, the laminate 10 can be held in a stable manner in the shell 17 by the bending of the extension 17x. Thereafter, the extension 17y is bent and pressed with the press member 31. In this case, the presence of the space g does not cause movement of the laminate 10 which has been already tightly secured in the shell 17. Thus, the bottom wall can be formed uniformly.

Since the extension 17x is longer than the extension 17y, an inner part 23a of the bottom wall formed by the extension 17x has a wider radial width than that of an outer part 23b formed by the extension 17y as shown in FIG. 12. This is advantage because the piezoelectric element 12 can be evenly supported by the inner part 23a so that the mechanical stress can be uniformly applied to the element 12, thereby ensuring satisfactory responsibility.

Figure 13:
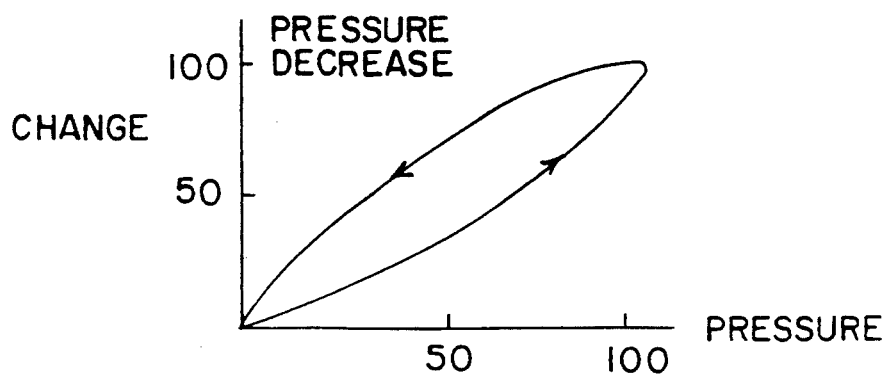
FIG. 13 is a graph showing a relationship between the charge generated in a piezoelectric sensor and the pressure applied to the sensor.

When the outer part 23b is wider than the inner part 23a, a hysteresis has been found to be caused in pressure response of the sensor S. Namely, as shown in FIG. 13, the charge generated at a given pressure in the course of a pressure increase stage is not the same as that in the course of a pressure decrease stage. Similar tendency is observed when the widths of the inner and outer parts 23a and 23b are equal to each other. Such a hysteresis is considered to be attributed to the fact that the pressure is not uniformly applied to the piezoelectric element because of non-uniformity of the structure of the bottom wall of the shell supporting the piezoelectric element.

It is preferred that the bent portions 17x and 17y be present in the bottom of the sensor S, since the aperture 23 between the inner and outer parts 23a and 23b can be entirely faced to the plug seat $r_2$ and the entire bottom wall can be contacted with the plug seat $r_2$, whereby the piezoelectric element 12 can uniformly receive the mechanical stress.

Figure 14:
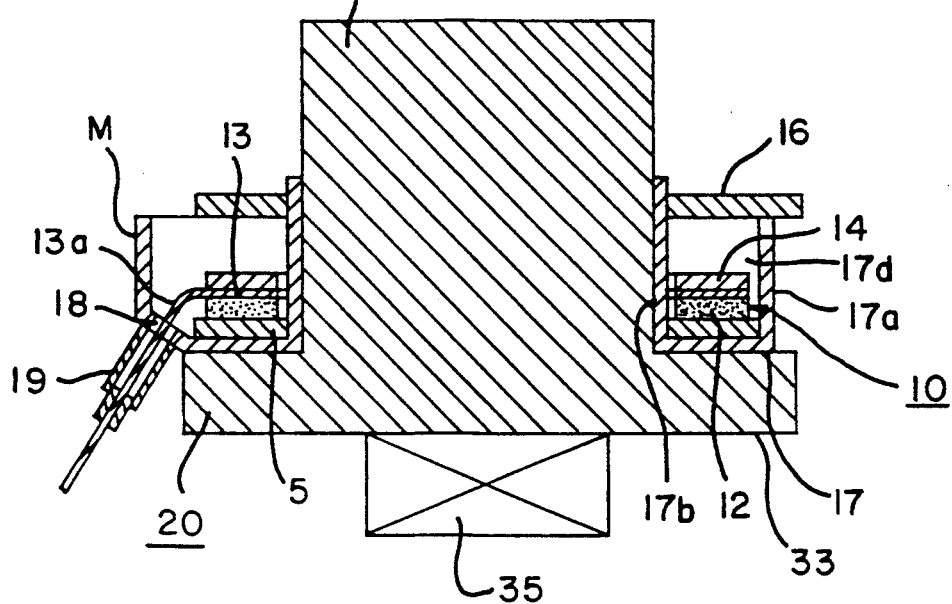
FIG. 14 is a cross-sectional elevational view diagrammatically showing an apparatus useful for assembling a piezoelectric sensor.
Figure 15:
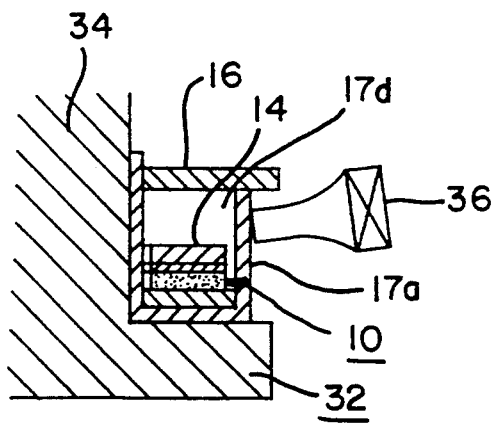
FIG. 15 is a fragmentary, cross-sectional, elevational view diagrammatically showing another embodiment of an apparatus for assembling a piezoelectric sensor.

In the assembling of the sensor S of the above construction, it is necessary that the eccentric, bottom plate be positioned in a specific position relative to the shell 17 in order to fit the plate 16 into the shell 17. FIGS. 14 and 15 illustrate a suitable method for the fitting of the bottom plate 16. First, a shell 17 in the form of a ring having an annular plate and a pair of outer and inner tubular plates 17a and 17b extending from the outer and inner peripheral edges of the annular plate, respectively, in the direction perpendicular to the plate is provided. The outer and inner plates 17a and 17b are circular in cross section and the centers thereof are greater than that of the outer plate 17b.

The shell 17 constructed as above and bearing the laminate 10 is fitted to a vibrator 32 with the open end portion thereof being oriented upward. The vibrator 32 has a base portion 33 from which a circular guide 34 extends upward. The base portion 33 has a drive member 35 operable to cause the vibrator 32 to vibrate. The shell 17 is placed on the vibrator 25 32 with the guide 34 being inserted into the inner tubular plate 17b. Then, an annular plate 16 which matches the annular space 17d defined between the outer and inner plates 17a and 17b is fitted on the guide 34. Then the drive means 35 is operated to vibrate the vibrator 32. This causes the annular plate 16 to rotate about the guide 34. When the annular plate 16 is positioned so that the outer periphery thereof matches the shape of the annular space 17d of the shell, the plate 16 falls within the space 17d by gravity.

The driving of the vibrator 32 may be effected by any other suitable means as long as the annular plate 16 placed on the shell 17 can be rotated about the guide 34. FIG. 15 depicts another type of drive means. Designated as 36 is a horn-type vibrator utilizing a piezoelectric element. The tip end portion of the vibrator 36 is contacted with the shell 17 to rotate the plate 16 and to position the plate 16 so as to fit into the annular space 17d of the shell 17.

Figure 17:
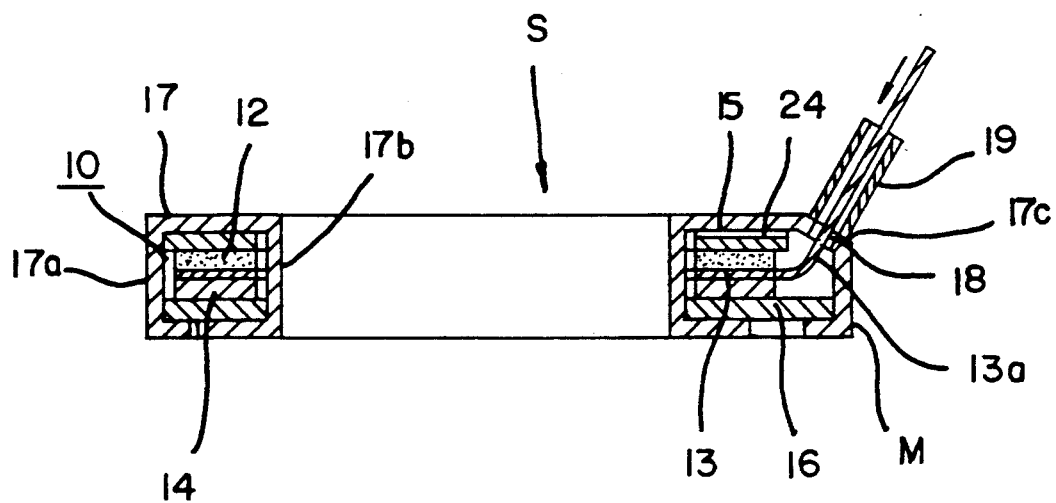
FIG. 17 is a cross-sectional, elevational view diagrammatically showing a further embodiment of a piezoelectric sensor of the present invention.

Thereafter, the inner and outer tubular plates 17b and 17a are bent and pressed as described above to obtain a sensor S as shown in FIG. 17.

Figure 16:
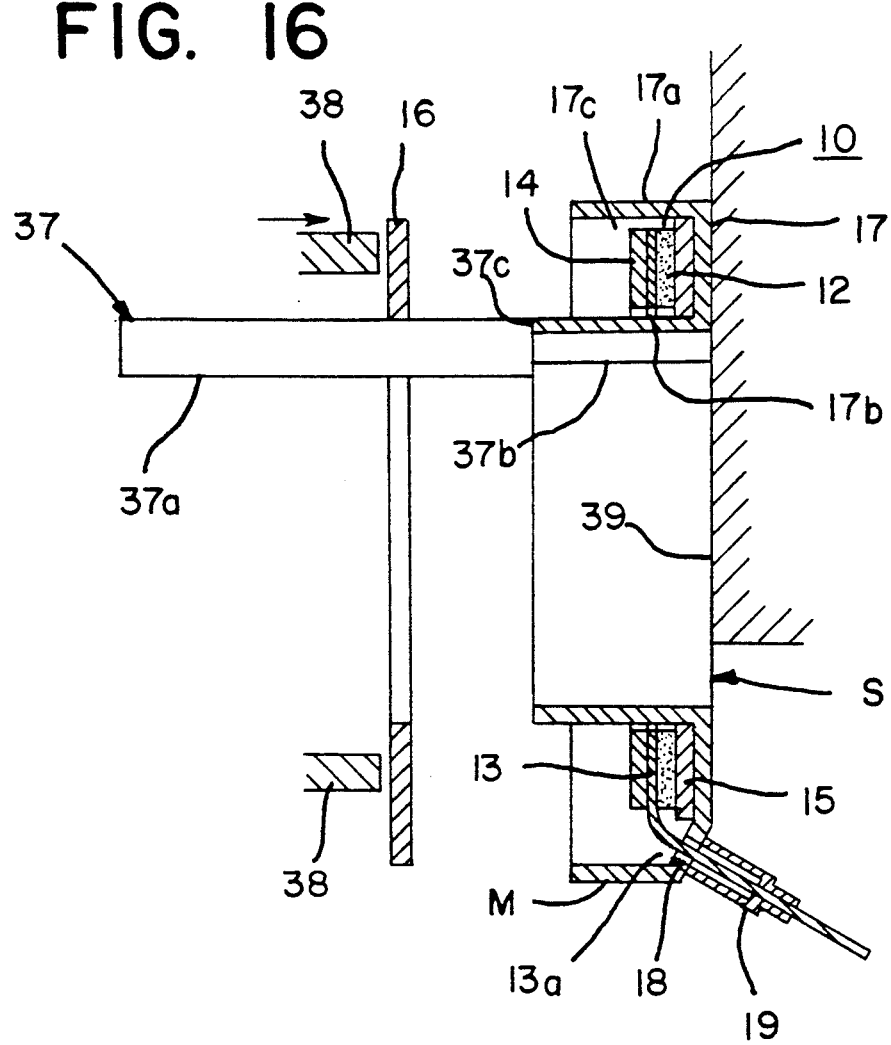
FIG. 16 is a fragmentary, cross-sectional, elevational view diagrammatically showing a further embodiment of an apparatus for assembling a piezoelectric sensor.

FIG. 16 illustrates another method for easily fitting the eccentric, annular plate 16 into the shell 17. Designated as 37 is a rod with a circular cross section supported in a horizontal position to a support wall 39. The rod 37 has a smaller diameter portion 37b and a coaxial, larger diameter portion 37a between which a stepped portion 37c is formed. The difference in diameter between the smaller and larger diameter portions 37b and 37a is made equal to the thickness of the inner tubular plate 17b. In assembling, the shell 17 bearing the laminate 10 other than the eccentric, annular plate 16 is suspended from the smaller diameter portion 37b of the horizontal rod 37. Because of the eccentricity, the shell 17 and the annular plate 16 are spontaneously positioned with their centers of gravity being vertically aligned. Namely, in the suspended state, the line extending through the centers of the inner and outer tubular plates 17b and 17a and the line extending through the centers of the inside and outside peripheries of the annular plate 16 coincide with the vertical line passing the central axis of the rod 37. As a result, when the annular plate 16 is displaced by means of a push rod 38 in the direction shown by the arrow, the plate 16 is fitted into the shell 17. Then, the inner and outer tubular plates 17b and 17a are bent over the annular plate 16 and pressed to tightly hold the laminate 10 to obtain the sensor S shown in FIG. 17.

In order to ensure the insulation between respective parts in the shell 17, it is desirable to fill the space in the shell 17 with a resin. Since the both sides of the laminate 10 are in pressure contact with the shell 17, it is difficult to fill the entire space in the shell 17 with the insulating resin. Especially, the gap between the inside tubular wall 17b and the inside periphery of the laminate 10 cannot be impregnated with the resin after the fabrication of the sensor s.

Figure 18:
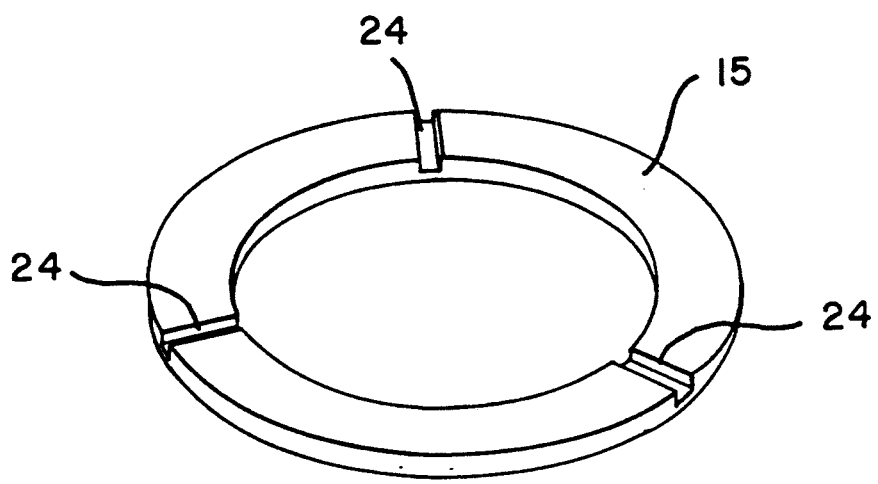
FIG. 18 is a perspective view schematically showing a top plate of the sensor of FIG. 17.

Thus, in a preferred embodiment according to the present invention as shown in FIG. 18, at least one of the top and bottom annular plates 15 and 16 (the top plate 15 in the illustrated embodiment) is formed with a plurality (three in the illustrated embodiment) of angularly equally spaced apart, radially extending grooves 24. The grooves form passages together with the top wall of the shell 17, through which passages the space defined between the outer tubular plate 17a and the laminate 10 is in fluid communication with the space defined between the inner tubular plate 17b and the laminate 10.

Figure 19:
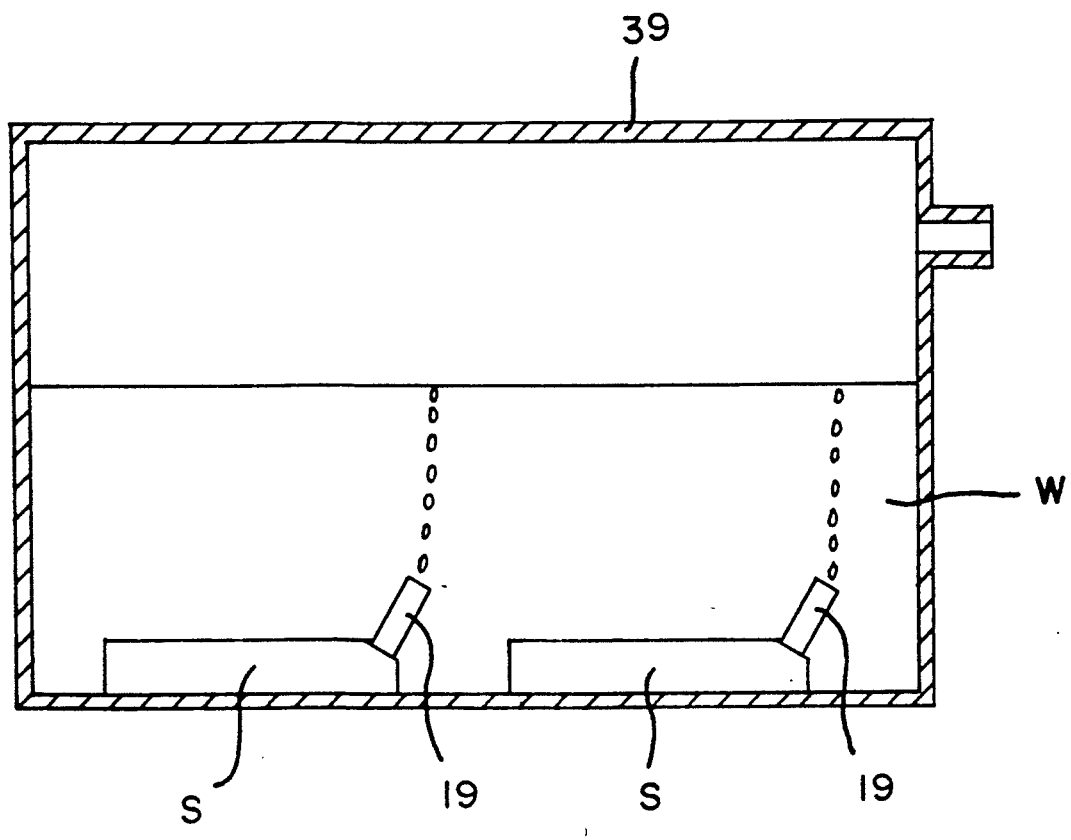
FIG. 19 is a cross-sectional, elevational view schematically showing a method for impregnating a piezoelectric sensor with a liquid resin composition; embodiment of the present invention.

When the sensor S thus constructed is immersed in a liquid resin composition w contained in a tank 39, as shown in FIG. 19, the resin can enter the space in the shell 17 through the guide pipe 19 and the grooves 24 into the gap around the inner tubular plate 17b. Since two or more grooves 24 are provided in the top plate 15, at lest one passage can be always feasible irrespective of the position of the top plate 15 so that the entire space within the shell can be surely filled with the resin. The liquid resin is subsequently hardened to provide desired electrical insulation. The number of the grooves is preferably 3 or more for reasons of facilitating replacement of the air with the liquid resin.

In the foregoing embodiments, the rotation of the sensor S is prevented by providing the outer periphery of the sensor S with such a portion M that the distance between the portion M and the axis L of rotation of the plug T is greater than the shortest distance between the axis L and the inside periphery of the plug insertion hole $r_1$ adjacent to the plug seat $r_2$ on which the sensor S is disposed.

Figure 20:
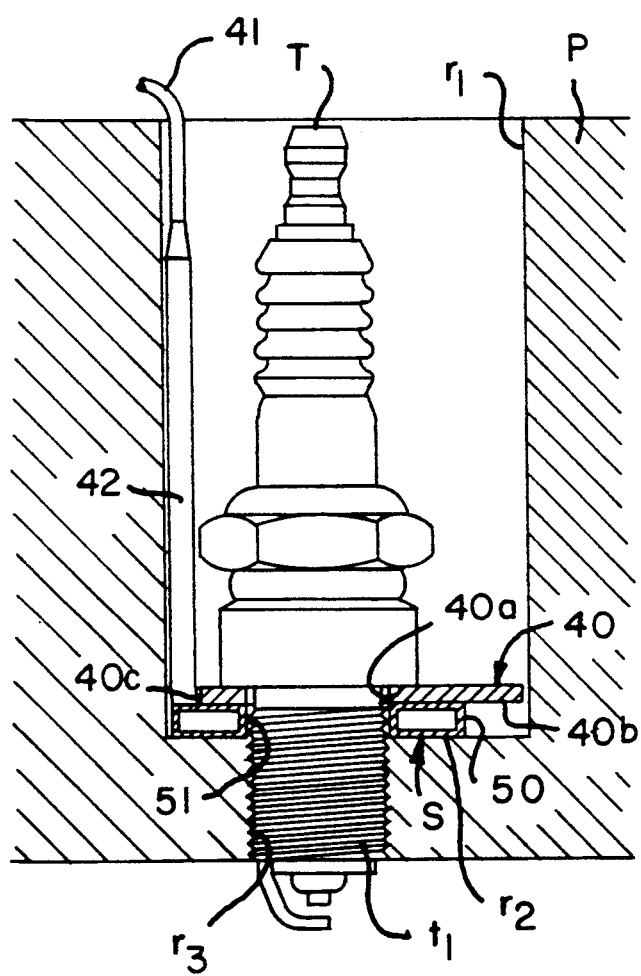
FIG. 20 is a fragmentary, cross-sectional, elevational view diagrammatically showing a further embodiment of cylinder internal pressure change detecting device according to the present invention using a gasket.

The following embodiments utilize a gasket to achieve the above object. Referring to FIG. 20, designated as T is an ignition plug having the same structure as that of the foregoing embodiments. The plug T has an externally threaded tip end portion $t_1$ which is threadingly engageable with an internally threaded portion $r_3$ and a stepped portion engageable with a plug seat $r_2$ provided in a plug insertion hole $r_1$ formed in a cylinder head P. The plug insertion hole $r_1$ has a circular inside peripheral portion whose center axis D is deviated from the axis L of the internally threaded portion $r_3$.

An annular piezoelectric sensor S has a shell 50 composed of concentrical outer side wall and inner side wall defining a hole 51 through which the plug T is inserted. Designated as 42 is a guide pipe through which a lead wire 41 extends. The shell 50 has such an outer diameter as to form a gap between the shell 50 and the inside periphery of the plug insertion hole $r_1$ through which gap the guide pipe 42 extends. By attaching the ignition plug P to the cylinder head T, the sensor S is tightly held between the annular stepped portion of the ignition plug T and the plug seat $r_2$.

An annular gasket 40 formed, for example, of copper is interposed between the piezoelectric sensor S and the stepped portion of the ignition plug P. The gasket 40 has a center opening 40a through which the plug T is inserted. The gasket 40 has such a peripheral portion N that the distance between the portion N and the axis L is greater than the shortest distance R between the axis L and the inside periphery of the plug insertion hole $r_1$.

Figure 21:
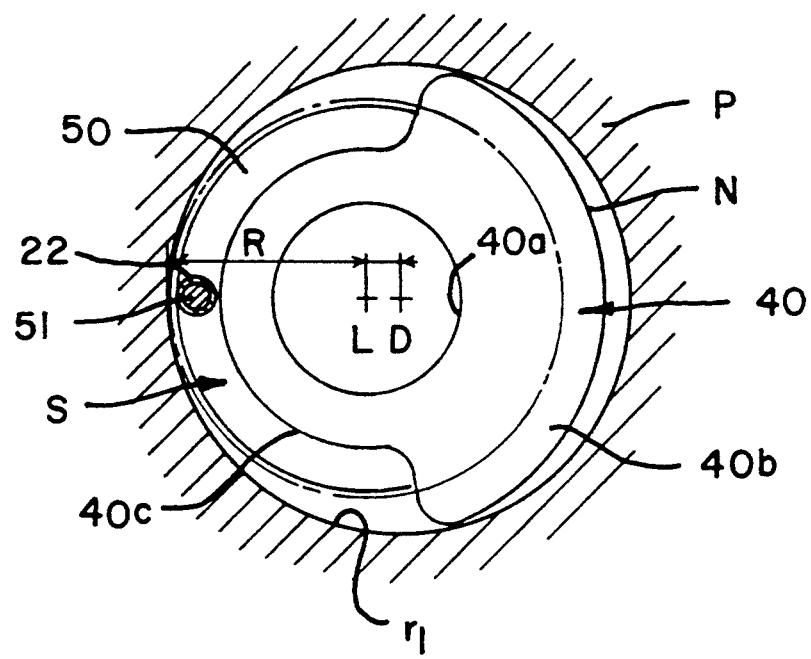
FIG. 21 is a fragmentary, cross-sectional, plan view of the device of FIG. 20.

Namely, as shown in FIG. 21, the gasket 40 has a radially outwardly extending, protruded portion 40b whose periphery N is located outside of a circle having a radius R as shown by a phantom line. As a result, the protruded portion 40b of the gasket 40 is brought into engagement with the circular inside periphery of the plug insertion hole $r_1$ upon rotation of thereof about the axis L of the internally threaded portion $r_3$ of the plug insertion hole $r_1$.

The gasket 40 is also provided with a cut-away portion 40c at such a position that the guide pipe 42 is not engaged by the gasket 40 upon rotation of the gasket 40 during the screwing of the ignition plug T for the attachment thereof to the plug hole $r_1$. When a hole is provided in the cylinder head P for the passage of the lead wire 41, it is not necessary to form such a cut-away portion 40c.

Thus, when the ignition plug T is screwed for being fitted to the plug hole $r_1$, the gasket 40 on the sensor S is rotated by frictional contact with the stepped portion of the plug T to cause the portion N of the protruded portion 40b to be brought into engagement with an inside periphery of the plug hole $r_1$ so that the gasket 40 is prevented from being further rotated in the screwing direction. As a consequence, the sensor S provided below the gasket 40 receive only an axial, pressing force from the rotation of the plug T.

Figure 22:
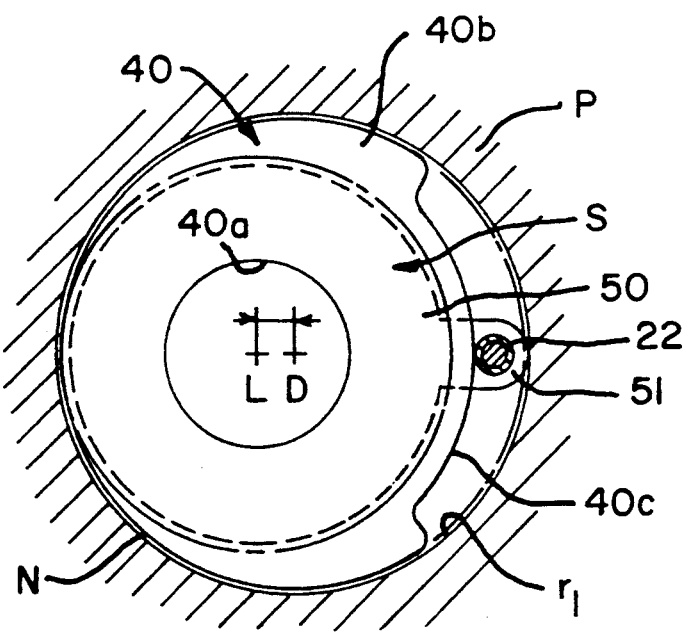
FIG. 22 is a fragmentary, cross-sectional, plan view, similar to FIG. 21, diagrammatically showing a second embodiment of the gasket-type device.
Figure 23:
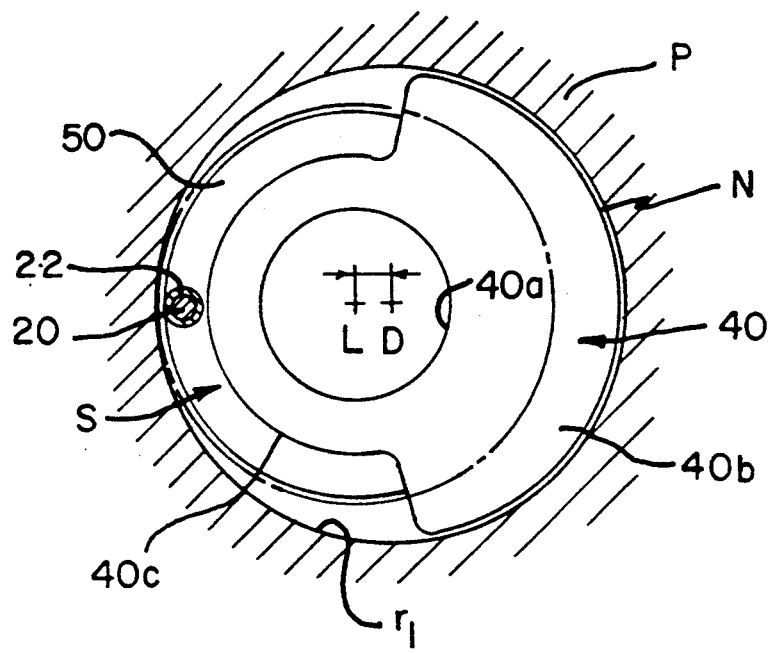
FIG. 23 is a fragmentary, cross-sectional, plan view, similar to FIG. 21, diagrammatically showing a third embodiment of the gasket-type device.
Figure 24:
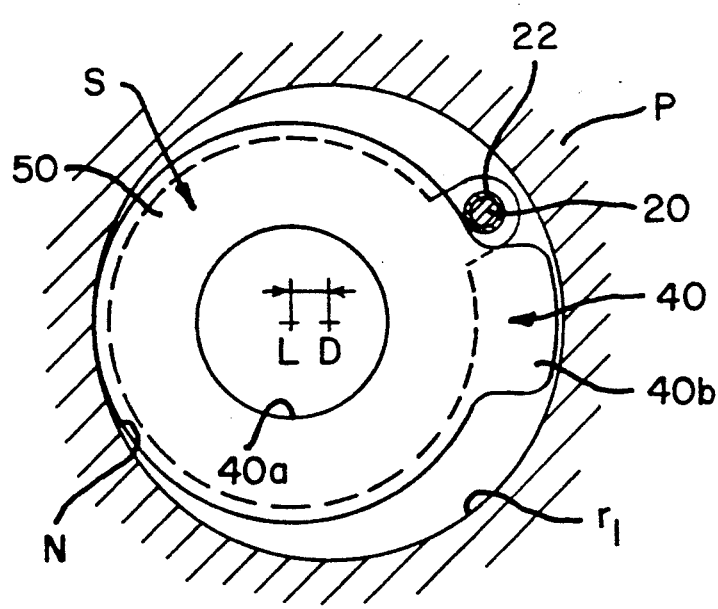
FIG. 24 is a fragmentary, cross-sectional, plan view, similar to FIG. 21, diagrammatically showing a fourth embodiment of the gasket-type device.
Figure 25:
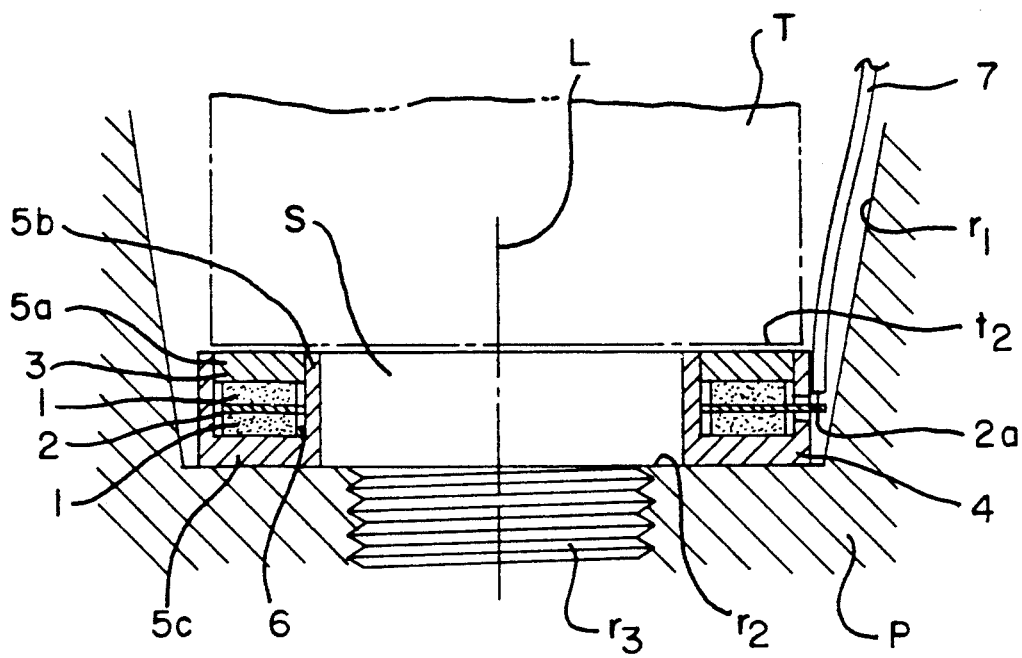
FIG. 25 is a fragmentary, cross-sectional, elevational view, similar to FIG. 1, diagrammatically showing a conventional pressure change detector.
Figure 26:
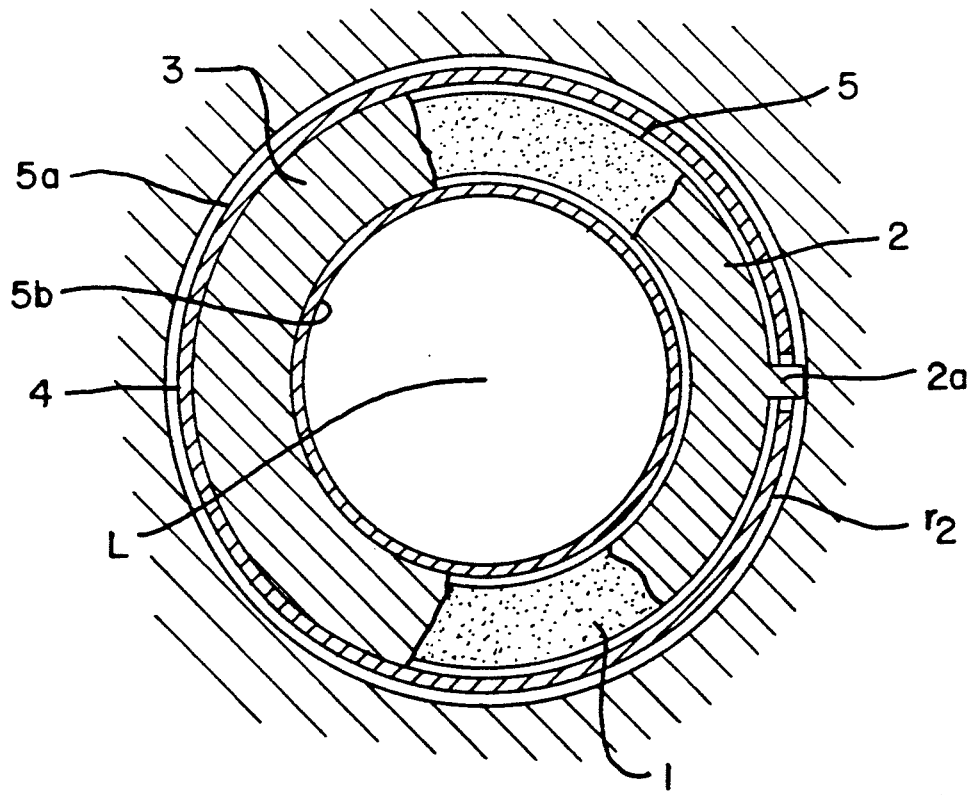
FIG. 26 is a cross-sectional, plan view, similar to FIG. 2, of the device of FIG. 25.

The shape of the gasket 40 is not limited to that shown in FIG. 21 in which the outer periphery N is circular whose center coincides with the center axis L. In the embodiment shown in FIG. 22, the gasket 40 is shaped to have an outer periphery N similar to the inside periphery of the plug insertion hole. In the embodiment shown in FIG. 23, the outer periphery N of the gasket is circular whose center coincides with with the axis D of the plug insertion hole $r_1$. The gasket of FIG. 24 has a portion N protruded from a circular periphery.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A device for detecting a change in internal pressure of a cylinder, comprising:
   a cylinder head;
   an axially extending ignition plug including a large diameter periphery portion, a small diameter periphery portion extending coaxially from an edge of said large diameter portion to form an annular stepped portion on said edge, and an externally threaded tip end portion coaxially extending from said small diameter periphery portion;
   a plug insertion hole formed in said cylinder head for receiving part of said ignition plug and having an internally threaded portion adapted to be in threading engagement with said externally threaded tip end portion of said ignition plug and a plug seat engageable with said annular stepped portion of said ignition plug; and
   an annular piezoelectric sensor disposed on said plug seat and having an opening whose diameter is greater than that of said small diameter periphery portion of said ignition plug but smaller than the large diameter periphery portion thereof; so that said ignition plug is capable of being fixed on said cylinder head when screwed into said plug insertion hole with said piezoelectric sensor being tightly pressed between said annular stepped portion of said ignition plug and said plug seat of said plug insertion hole to detect a change in pressure within said cylinder;
   said sensor having a polygonal outer periphery and said plug insertion hole having a polygonal inside peripheral portion such that, when said ignition plug is screwed for being fitted to said plug hole, a part of the outer periphery of said sensor placed on said plug seat is brought into engagement with an inside periphery of said plug hole upon rotation thereof about the axis of said internally threaded portion of said plug insertion hole and is thereby prevented from being further rotated in the screwing direction.

2. A device for detecting a change in internal pressure of a cylinder, comprising:
   a cylinder head;
   an axially extending ignition plug including a large diameter periphery portion, a small diameter periphery portion extending coaxially from an edge of said large diameter portion to form an annular stepped portion on said edge, and an externally threaded tip end portion coaxially extending from said small diameter periphery portion;
   a plug insertion hole formed in said cylinder head for receiving part of said ignition plug and having an internally threaded portion adapted to be in threading engagement with said externally threaded tip end portion of said ignition plug and a plug seat engageable with said annular stepped portion of said ignition plug; and
   an annular piezoelectric sensor disposed on said plug seat and having an opening whose diameter is greater than that of said small diameter periphery portion of said ignition plug but smaller than the large diameter periphery portion thereof; so that said ignition plug is capable of being fixed on said cylinder head when screwed into said plug insertion hole with said piezoelectric sensor being tightly pressed between said annular stepped portion of said ignition plug and said plug seat of said plug insertion hole to detect a change in pressure within said cylinder;
   said sensor having an ellipsoidal outer periphery and said plug insertion hole having an ellipsoidal inside peripheral portion so that when said ignition plug is screwed for being fitted to said plug hole the outer periphery of said sensor is engageable with said inside peripheral portion of said plug insertion hole upon rotation thereof about the axis of said internally threaded portion of said plug insertion hole and is thereby prevented from being further rotated in the screwing direction.

3. A device for detecting a change in internal pressure of a cylinder, comprising:
   a cylinder head;
   an axially extending ignition plug including a large diameter periphery portion, a small diameter periphery portion extending coaxially from an edge of said large diameter portion to form an annular stepped portion on said edge, and an externally threaded tip end portion coaxially extending from said small diameter periphery portion;
   a plug insertion hole formed in said cylinder head for receiving part of said ignition plug and having an internally threaded portion adapted to be in threading engagement with said externally threaded tip end portion of said ignition plug and a plug seat engageable with said annular stepped portion of said ignition plug; and
   an annular piezoelectric sensor disposed on said plug seat and having an opening whose diameter is greater than that of said small diameter periphery portion of said ignition plug but smaller than the large diameter periphery portion thereof; so that said ignition plug is capable of being fixed on said cylinder head when screwed into said plug insertion hole with said piezoelectric sensor being tightly pressed between said annular stepped portion of said ignition plug and said plug seat of said plug insertion hole to detect a change in pressure within said cylinder;

said sensor having a D-shaped outer periphery and said plug insertion holes having a D-shaped inside peripheral portion so that when said ignition plug is screwed for being fitted to said plug hole the outer periphery of said sensor is engageable with said inside peripheral portion of said plug insertion hole upon rotation thereof about the axis of said internally threaded portion of said plug insertion hole and is thereby prevented from being further rotated in the screwing direction.

4. A device for detecting a change in internal pressure of a cylinder, comprising:

a cylinder head;

an axially extending ignition plug including a large diameter periphery portion, a small diameter periphery portion extending coaxially from an edge of said large diameter portion to form an annular stepped portion on said edge, and an externally threaded tip end portion coaxially extending from said small diameter periphery portion;

a plug insertion hole formed in said cylinder head for receiving part of said ignition plug and having an internally threaded portion adapted to be in threading engagement with said externally threaded tip end portion of said ignition plug and a plug seat engageable with said annular stepped portion of said ignition plug; and an annular piezoelectric sensor disposed on said plug seat and having an opening whose diameter is greater than that of said small diameter periphery portion of said ignition plug but smaller than the large diameter periphery portion thereof; so that said ignition plug is capable of being fixed on said cylinder head when screwed into said plug insertion hole with said piezoelectric sensor being tightly pressed between said annular stepped portion of said ignition plug and said plug seat of said plug insertion hole to detect a change in pressure within said cylinder;

said plug insertion hole having a circular inside peripheral portion whose center is deviated from the axis of said internally threaded portion of said plug hole and said sensor having a circular outer periphery substantially equal to or slightly small than said circular inside peripheral portion of said plug insertion hole so that when said ignition plug is screwed for being fitted to said plug hole the outer periphery of said sensor is engageable with said inside peripheral portion of said plug insertion hole upon rotation thereof about the axis of said internally threaded portion of said plug insertion hole and is thereby prevented from being further rotated in the screwing direction.

5. A device as in claim 4, wherein said piezoelectric sensor includes a shell in the form of a ring comprising a pair of parallel, top and bottom annular walls and a pair of inner and outer tubular walls, and an annular piezoelectric element disposed within said shell, one of said top and bottom walls of said shell being formed by radially inwardly bending an end portion of the outer tubular wall and by radially outwardly bending an end portion of the inner tubular wall, the width of said outwardly bent part being greater than that of said inwardly bent portion.

6. A device as in claim 4, wherein said piezoelectric sensor includes:

a shell in the form of a ring comprising a pair of parallel, top and bottom annular walls and a pair of inner and outer tubular walls;

an annular piezoelectric element disposed within said shell to define a space between the outer periphery thereof and said outer tubular wall of said shell;

an annular bottom plate disposed between said bottom wall of said shell and said piezoelectric element and extending throughout the inside surface of said bottom wall, said bottom wall being formed by radially inwardly bending an end portion of the outer tubular wall and by radially outwardly bending an end portion of the inner tubular wall, and a portion of the edge defined by said top wall and said outer wall being tapered at a position adjacent to said space to form a tapered surface;

a guide pipe connected to said tapered surface and oriented in the direction normal to said tapered surface; and a lead wire electrically connected to said piezoelectric element at a location adjacent to said space and extending through said tapered surface and through said guide pipe.

7. A device as in claim 4, wherein said piezoelectric sensor includes:

a shell in the form of a ring comprising a pair of parallel, top and bottom annular walls and a pair of inner and outer tubular walls;

an annular piezoelectric element disposed within said shell to define a space between the outer periphery thereof and said outer tubular wall of said shell;

an annular bottom plate disposed between said bottom wall of said shell and said piezoelectric element and extending throughout the inside surface of said bottom wall;

an annular top plate disposed between said top wall of said shell and said piezoelectric element; and a lead wire electrically connected to said piezoelectric element at a position adjacent to said space and extending through an upper opening provided in said top wall, at least one of said top and bottom plates having at least two, radially extending, angularly equally spaced apart grooves so that when said sensor is immersed in a liquid resin composition, the composition can flow through said upper opening and said grooves and can fill the entire space in said shell.

8. A device for detecting a change in internal pressure of a cylinder, comprising:

a cylinder head;

an axially extending ignition plug including a large diameter periphery portion, a small diameter periphery portion extending coaxially from an edge of said large diameter portion to form an annular stepped portion on said edge, and an externally threaded tip end portion coaxially extending from said small diameter periphery portion;

a plug insertion hole formed in said cylinder head for receiving part of said ignition plug and having an internally threaded portion adapted to be in threading engagement with said externally threaded tip end portion of said ignition plug and a plug seat engageable with said annular stepped portion of said ignition plug; and an annular piezoelectric sensor disposed on said plug seat and having an opening whose diameter is greater than that of said small diameter periphery portion of said ignition plug but smaller than the large diameter periphery portion thereof; so that said ignition plug is capable of being fixed on said cylinder head when screwed into said plug insertion hole with said piezoelectric sensor being tightly pressed between said annular stepped portion of said ignition plug and said plug seat of said plug insertion hole to detect a change in pressure within said cylinder;

said piezoelectric sensor also including a shell in the form of a ring comprising a pair of parallel, top and bottom annular walls and a pair of inner and outer tubular walls;

an annular piezoelectric element disposed within said shell to define a space between the outer periphery thereof and said outer tubular wall of said shell;

a lead wire electrically connected to said piezoelectric element at a location adjacent to said space and extending through said top annular wall of said shell; and said sensor having an outer periphery such that, when said ignition plug is screwed for being fitted to said plug hole, a part of the outer periphery of said sensor placed on said plug seat is brought into engagement with an inside periphery of said plug hole and is thereby prevented from being further rotated in the screwing direction.

9. A device for detecting a change in internal pressure of a cylinder, comprising a cylinder head;

an axially extending ignition plug including a large diameter periphery portion, a small diameter periphery portion extending coaxially from an edge of said large diameter portion to form an annular stepped portion on said edge, and an externally threaded tip end portion coaxially extending from said small diameter periphery portion;

a plug insertion hole formed in said cylinder head for receiving part of said ignition plug and having an internally threaded portion adapted to be in threading engagement with said externally threaded tip end portion of said ignition plug and a plug seat engageable with said annular stepped portion of said ignition plug, said plug insertion hole having a circular inside peripheral portion whose center is deviated from the axis of said internally threaded portion of said plug hole;

an annular piezoelectric sensor disposed on said plug seat and having an opening whose diameter is greater than that of said small diameter periphery portion of said ignition plug but smaller than the large diameter periphery portion thereof, so that said ignition plug is capable of being fixed on said cylinder head when screwed into said plug insertion hole with said piezoelectric sensor being tightly pressed between said annular stepped portion of said ignition plug and said plug seat of said plug insertion hole to detect a change in pressure within said cylinder; and an annular gasket interposed between said piezoelectric sensor and said stepped portion of said ignition plug and having such a peripheral portion that the distance between the edge of said peripheral portion of said gasket and the axis of said internally threaded portion of said plug hole is greater than the shortest distance between the axis of said internally threaded portion and the circular inside periphery of said plug insertion hole, so that said protruded portion of said gasket is brought into engagement with the circular inside periphery of said plug insertion hole upon rotation of thereof about the axis of said internally threaded portion of said plug insertion hole.

10. A device as set forth in claim 9, further comprising a lead wire electrically connected to said piezoelectric sensor, and a guide pipe through which said lead wire extends, said gasket having a cut-away portion at such a position that said guide pipe is not engaged by said gasket upon rotation of said gasket during the screwing of said ignition plug for attachment thereof to said plug hole.

11. A method for producing a piezoelectric sensor, comprising the steps of:

providing a shell in the form of a ring having an annular top plate and a pair of outer and inner tubular plates extending from the outer and inner peripheral edges of said top plate, respectively, in the direction perpendicular to said top plate, said outer and inner edges of said top plate being circular in shape with the center of said outer edge being deviated from that of said inner edge;

providing an annular composite body including an annular layer of a piezoelectric element;

providing an annular bottom plate which matches the annular space defined between said outer and inner tubular plates;

fitting said composite body and said bottom plate in this order in the space between said outer and inner tubular plates with the openings of said composite body and said bottom plate being inserted into said inner tubular plate;

radially outwardly folding an end portion of said inner tubular plate to cover an inner periphery of said bottom plate; and then radially inwardly folding an end portion of said outer tubular plate to cover an outer periphery of said bottom plate, thereby to integrally tightly unite said composite body and said bottom plate in said shell.

12. A method as set forth in claim 11, wherein said fitting of said bottom plate in said space is performed by positioning said bottom plate adjacent to said space of said shell with said inner tubular plate being loosely fitted into the opening of said bottom plate, said shell being placed with said top plate thereof being oriented downward, and said shell being vibrated to cause said bottom plate to rotate about said inner tubular plate until said bottom plate can be fitted into said space.

13. A method as set forth in claim 11, wherein said fitting of said bottom plate in said space is performed by suspending said shell and said bottom plate from a horizontally extending round rod inserted into each of the openings thereof so that said bottom plate is positioned in the same attitude as that of said space, said bottom plate thus positioned being subsequently displaced along said horizontal bar and inserted into said space.

* * * * *